INVENTORS
John W. Rosenkrands &
BY Manfred A. Isaacson
W. J. Wagner
ATTORNEY

United States Patent Office 3,149,690
Patented Sept. 22, 1964

3,149,690
VARIABLE ROLL RATE SWING AXLE
SUSPENSION
John W. Rosenkrands, Detroit, and Manfred A. Isaacson, Pontiac, Mich., assignors to General Motors Corporation, Detroit, Mich., a corporation of Delaware
Filed Aug. 27, 1962, Ser. No. 219,432
16 Claims. (Cl. 180—73)

This invention relates to swing axle suspension for vehicles and more particularly to swing axle suspension including means for reducing roll stiffness.

The expression "swing axle suspension," as used herein, is intended to broadly denote a construction wherein each of a pair of half axle driven wheels is rotatably mounted on the outer end of a laterally extending wheel control arm, the inner end of which is pivotally attached to the vehicle sprung mass at or near the vehicle longitudinal centerline. While this basic form of suspension affords considerable advantage in terms of simplicity, cost, and certain operational characteristics, it is well known that high roll stiffness or roll rate is inherent. In practice, this characteristic has been found to produce undesirable handling characteristics.

An object of the present invention is to provide an improved swing axle suspension for vehicle driving wheels.

Another object is to provide a swing axle suspension incorporating differentially responsive interconnecting means for modifying the effect of the elastic medium so that the vehicle roll rate is low in relation to parallel ride deflection rate.

A further object is to provide a suspension of the stated character in which the roll rate varies progressively in proportion to the degree of roll deflection of the sprung mass of the vehicle.

Still a further object is to provide a suspension of the stated character wherein no load is imposed on the vehicle frame or sprung mass incident to parallel ride deflection.

Yet a further object is to provide a swing axle suspension including a pair of laterally spaced longitudinally extending torsion springs operatively connected at one end to a pair of laterally oppositely extending wheel control arms, the other end of each torsion spring being supported on the vehicle and interconnected transversely in a manner whereby parallel ride deflection causes a constant rate of torsional wind-up while roll deflection of the vehicle causes decrease in the torsional wind-up rate of the spring on the outboard side of the turn and increased torsional wind-up rate on the inboard side of the turn.

A still further object is to provide a structure of the stated character including remotely controlled adjusting means acting on the transverse interconnection to regulate the normal standing height of the vehicle.

These and other objects, advantages and features of the invention will become more fully apparent as reference is had to the accompanying specification and drawings wherein.

Figure 1:
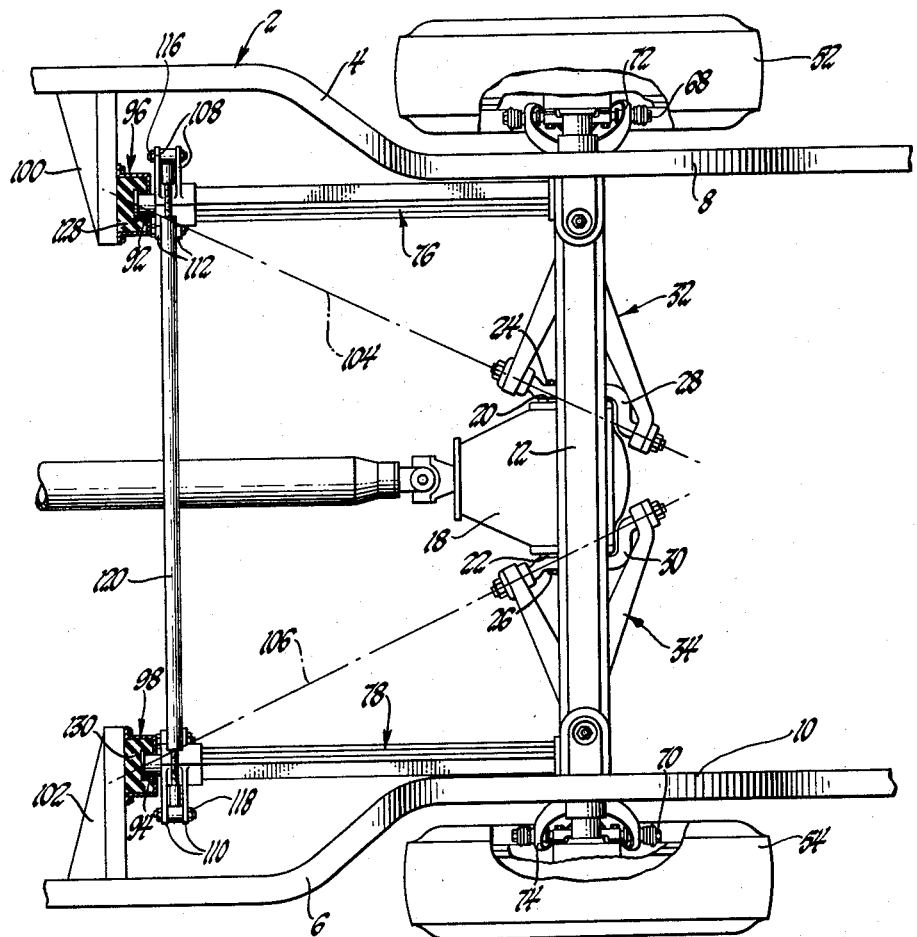
FIGURE 1 is a partial plan view of a vehicle chassis illustrating an independent rear wheel suspension in accordance with the invention.
Figure 2:
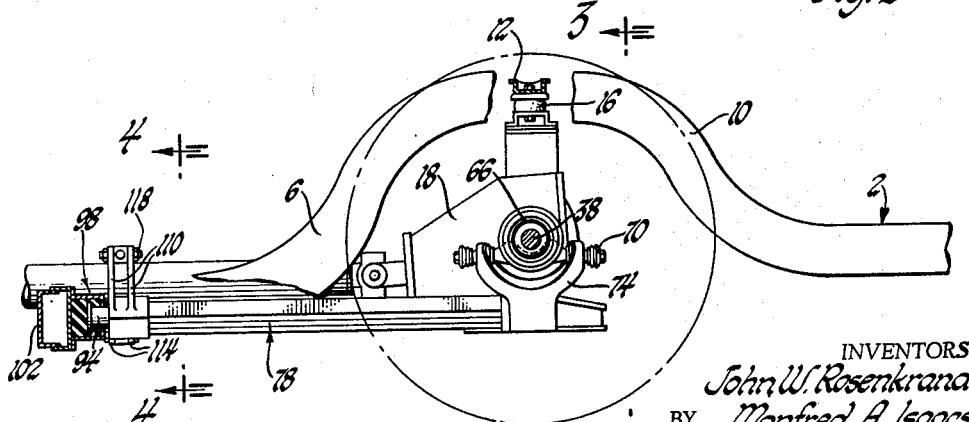
FIGURE 2 is a side elevational view, partly in section and with parts broken away, of the construction shown in FIGURE 1.
Figure 3:
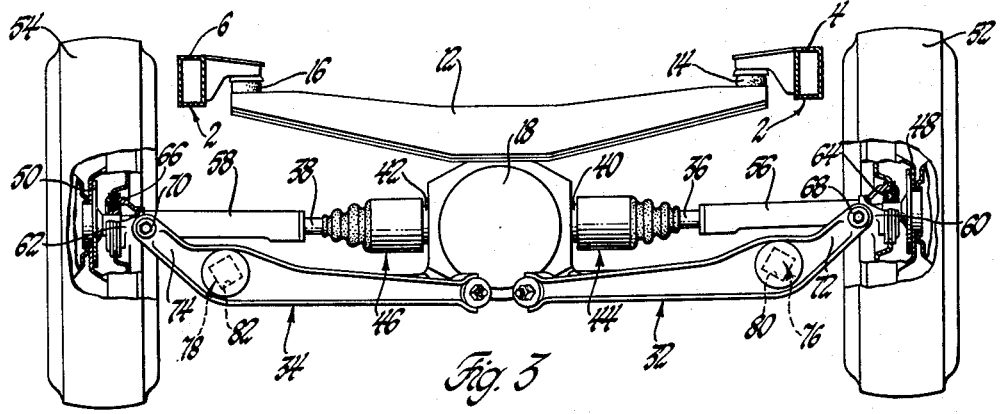
FIGURE 3 is an end elevation looking in the direction of arrows 3—3 of FIGURE 2.

Referring now to the drawings and particularly FIGURES 1, 2 and 3, there is illustrated a vehicle suspension assembly in which the reference numeral 2 generally designates the vehicle superstructure or frame. Frame 2 includes a pair of longitudinally extending side rails 4 and 6 having kick-up portions 8 and 10 beneath which is disposed a transversely extending cross member 12, the opposite ends of which are resiliently suspended from the respective side rails by elastic mounts 14 and 16. Depending from and rigidly connected to the center of cross member 12 is an engine driven differential assembly 18. Near the lower end thereof, assembly 18 is formed with parallel longitudinally extending bosses 20 and 22 to which are connected, as by bolts 24 and 26, pivot shaft members 28 and 30 having opposite extremities which form diagonally directed inboard axes supporting the bifurcated inboard ends of transversely oppositely extending wheel control arms 32 and 34. Spaced above pivot members 28 and 30 and extending in transverse opposite directions from differential 14 are a pair of "live" half axles 36 and 38, the inboard ends of which are operatively connected to differential output members 40 and 42 in axially slidable relation to form "pot type" universal joints 44 and 46. As seen best in FIGURE 3, axles 36 and 38 terminate at their outer ends in enlarged bolt-on flanges 48 and 50 to which the vehicle driving wheels 52 and 54 are operatively connected. Spaced slightly inwardly of flanges 48 and 50 are a pair of tubular sleeve members 56 and 58 which surround a major portion of the length of each half axle 36 and 38. At their extreme outer end, sleeves 56 and 58 are formed with bell shaped housings 60 and 62 containing anti-friction bearings 64 and 66 which rotatably support the outer end of the respective half axle and absorb axial thrust imposed thereon. Attached to an inwardly facing boss portion of each housing 60 and 62 is a pivot shaft assembly 68 and 70 to which the upwardly inclined outer end 72 and 74 of each control arm 32 and 34 is pivotally attached.

According to one feature of the invention, elastic support of the sprung mass of the vehicle relative to wheels 52 and 54 is accomplished by a pair of laterally spaced longitudinally extending laminated leaf torsion spring members 76 and 78 which are disposed so that the rearward ends are slidably received in cooperating socket portions 80 and 82 formed in arms 32 and 34 near the outboard ends thereof. The forward ends of springs 76 and 78 in turn engage sockets 84 and 86 formed in anchor members 88 and 90 having pivot portions 92 and 94 which are rotatably supported in laterally elongated flexible mounts 96 and 98. Mounts 96 and 98 are secured to brackets 100 and 102 on frame 2 generally in alignment with the projected axes 104 and 106 of pivot shafts 28 and 30 so that the major axis of each spring 76 and 78 intersects the projected axes 104 and 106 approximately laterally midway of each mount.

Figure 4:
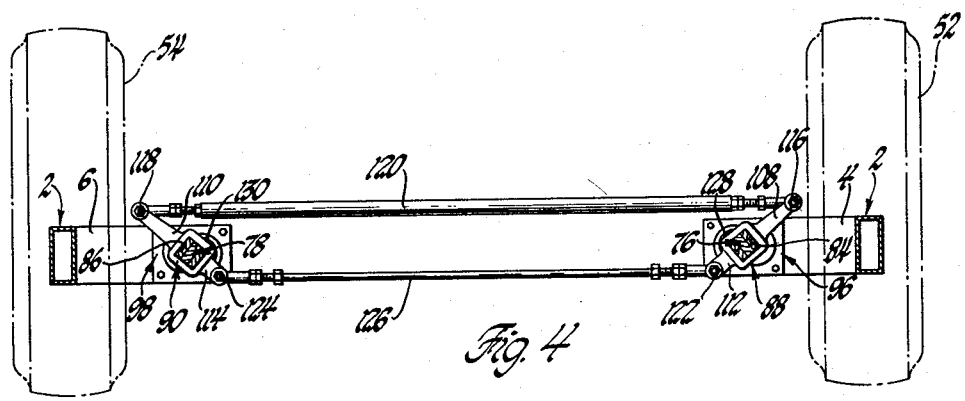
FIGURE 4 is an end elevation, partly in section, looking in the direction of arrows 4—4 of FIGURE 2.

In accordance with another feature of the invention, anchor members 88 and 90 are interconnected transversely so that forces resulting from uniform opposite torsional wind-up impose no load whatever on the vehicle frame. As seen best in FIGURE 4, this is accomplished by forming anchors 88 and 90 with integral upwardly extending lever arms 108 and 110 and integral downwardly extending lever arms 112 and 114. The free ends of arms 108 and 110 are pivotally connected by pin joints 116 and 118 to compression-tension strut 120, while the free ends of arms 112 and 114 are pivotally connected by pin joints 122 and 124 to a compression-tension strut 126. From visual observation of FIGURES 3 and 4, it will be evident that corresponding upward or downward deflection of control arms 32 and 34 will impose torsional wind-up on springs 76 and 78 in equal amounts but opposite directions. Consequently, the load imposed by such torsional wind-up is absorbed entirely by struts 120 and 126 thereby totally freeing the frame 2 from such loads. In contrast, the spring forces in conventional suspension impose a direct load on the vehicle frame.

According to the principal feature of the invention, the anchor members 88 and 90 are interconnected by struts 120 and 126 in a manner enabling the respective anchor members to rotate slightly under conditions of vehicle roll deflection so that the roll deflection rate is significantly lower than the roll deflection rate obtained from a comparable construction in which the forward ends of the torsion springs are fixedly anchored to the vehicle frame. In order to accomplish this objective, the lever arms 108 and 110 are inclined outwardly from the axis of the respective pivots 92 and 94, while the lever arms 112 and 114 are inclined inwardly therefrom. Struts 120 and 126 are formed to a predetermined length with provisions for limited adjustment of the lengths thereof so that the extent of angular inclination of arms 108–112 and 110–114 may be varied depending upon the vehicle involved and the degree of roll rate reduction desired. As a result there is formed a trapezoidal linkage in which the arms 108–112 and arms 110–114, respectively, form the nonparallel sides. Since this trapezoidal linkage is also pivotally secured to the vehicle frame by pivot members 92 and 94, it will be evident that on a purely geometric basis, the transverse interconnection establishes a mechanical "lock up," i.e., rotation of anchor 88 or 90 is theoretically impossible. However, as pointed out previously, each pivot member 92 and 94 is rotatably mounted in a transversely elongated flexible mount 96 and 98, respectively. Therefore, when anchor 90 is subjected to a torsional loading by spring 78 in a clockwise direction, while anchor 88 is simultaneously relieved of counterclockwise torsional loading by spring 76, as in cornering to the right, the elongated rubber masses 128 and 130 of mounts 96 and 98 in which pivots 92 and 94 are rotatably disposed, permits anchor 90 to shift strut 120 toward the right while anchor 88 shifts strut 126 toward the left, the geometric error being accommodated by inward or outward shifting of the respective pivots in rubber masses 128 and 130. It will now be seen that a predetermined controlled reduction in roll stiffness of any desired degree may be accomplished by the interconnection structure described, variations being achieved by proper selection of the initial or normal opposite inclination of anchor lever arm 108–112 and 110–114, respectively. Variation for a given opposite angular inclination of the lever arms 108–112 and 110–114 may also be introduced by establishing a length ratio between the upper lever arms and lower lever arms.

Figure 5:
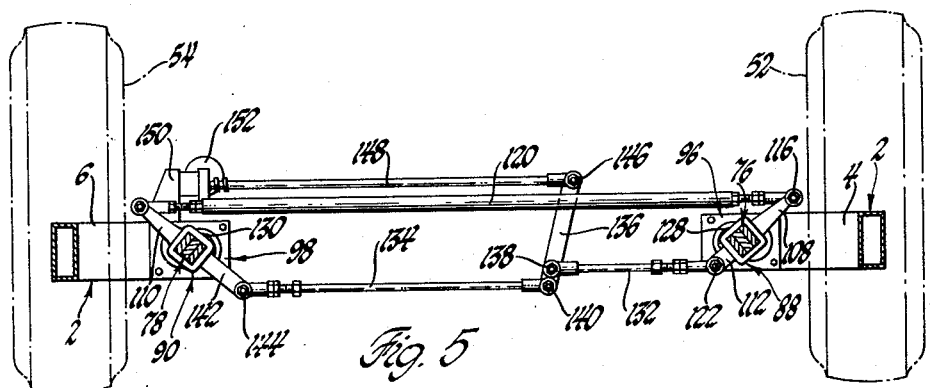
FIGURE 5 illustrates a modification of the structure shown in FIGURE 4.

In FIGURE 5, there is shown a modification of the anchor and strut rod construction enabling selective adjustment of the standing height of the vehicle to compensate for variations in passenger load. In the modified construction, the strut rod 120 is pivotally connected to lever arms 108 and 110 in the same manner as described with reference to the construction of FIGURE 4. However, strut rod 126 is replaced by a pair of vertically staggered rods 132 and 134 arranged in generally end to end relation. Rod 132 is pivotally connected at its outer end to lever arm 112 by pivot 122 and at its inner end to a generally vertically extending floating lever 136 by pin joint 138. Rod 134 in turn is pivotally connected at its inner end to lever 136 by a pin joint 140 vertically spaced from pivot 138. At its outer end, rod 134 is pivotally connected to lever arm 142 of anchor 90 by pin joint 144. Lever arm 142 is somewhat longer than lever arm 112 to compensate for the vertically staggered relation of strut rods 132 and 134. At its upper end, lever 136 is pivotally attached by a pin joint 146 to the inner end of a transversly directed rod 148. The outer end of rod 148 is mounted in a housing 150 on frame 2 and is driven rectilinearly relative thereto by a remotely operable electric motor 152. In operation, the standing height of the vehicle is regulated by energizing motor 152 to cause rod 148 to move either toward the left or right depending upon whether the initial standing height is low or high. If, for example, the standing height of frame 2 is too low, rod 148 is actuated toward the left as viewed in FIGURE 5. This movement causes lever 136 to displace rods 132 and 134 axially toward each other, decreasing the lateral space between the lower ends of anchor levers 112 and 142 and urging pivots 92 and 94 of anchors 88 and 90 toward each other on rubber masses 128 and 130. As a result, anchors 88 and 90 effectively rotate clockwise and counterclockwise, respectively, to impose additional torsional wind-up of springs 76 and 78 and thus raise the standing height of frame 2. To lower the standing height of the vehicle, rod 148 is actuated toward the right reversing the mode of operation just described so that torsional wind-up of springs 76 and 78 is reduced the desired degree.

While two embodiments of the invention have been shown and described, it will be apparent that other changes and modifications may be made therein. It is, therefore, to be understood that it is not intended to limit the invention to the embodiments shown, but only by the scope of the claims which follow.

What is claimed is:

1. In a vehicle suspension, a pair of oppositely extending control arms each having a road wheel mounted on the outer end thereof, separate torsionally elastic spring means engaging each control arm, a double arm lever type anchor for each spring pivotally mounted on said vehicle, and a pair of struts disposed at opposite sides of a common plane containing the axes of rotation of the pivotal connections for each anchor, one of said struts being longer than the other, and means pivotally connecting said struts to said anchors in spaced relation from the axes of rotation of the latter.

2. The structure set forth in claim 1 wherein the pivotal connections for each anchor are supported in an elastic mount secured on the vehicle.

3. The structure set forth in claim 2 wherein the elastic supports are formed to allow limited fore and aft, transverse and vertical freedom of movement of said pivotal connections.

4. The structure set forth in claim 3 wherein the degree of freedom of movement of said pivotal connection transversely is substantially greater than the freedom of movement fore and aft and vertically.

5. The structure set forth in claim 4 wherein the elastic mounts comprise transversely elongated rubber bodies disposed in a common plane normal to the major axes of said springs.

6. In a vehicle suspension, a pair of oppositely extending control arms each having a driven road wheel mounted on the outer end thereof, a longitudinally extending torsion spring disposed between each control arm and said vehicle, means rigidly connecting the rearward end of each spring to the adjacent control arm, an anchor member connected to the forward end of each spring, means pivotally mounting each of said anchors to said vehicle on a longitudinal axis colinear with the major axis of the associated spring, oppositely extending lever arms formed on each anchor, and a pair of struts pivotally connected to said lever arms to form a trapezoidal linkage.

7. In a vehicle suspension, a pair of oppositely extending control arms each having a driven road wheel mounted on the outer end thereof, a longitudinally extending laminated leaf torsion spring disposed beween each control arm and said vehicle, means rigidly connecting the rearward end of each spring to the adjacent control arm, an anchor member connected to the forward end of each spring, means pivotally mounting each of said anchors to said vehicle on a longitudinal axis colinear with the major axis of the associated spring, oppositely extending lever arms formed on each anchor, and a pair of struts pivotally connected to said lever arms to form a trapezoidal linkage.

8. In a vehicle suspension, a pair of oppositely extending control arms each having a driven road wheel mounted on the outer end thereof, a longitudinally extending laminated leaf torsion spring of generally square cross section disposed between each control arm and said vehicle, socket means rigidly connecting the rearward end of each spring to the adjacent control arm, an anchor member connected to the forward end of each spring, means pivotally mounting each of said anchors to said vehicle on a longitudinal axis colinear with the major axis of the associated spring, oppositely extending lever arms formed on each anchor in a plane normal to the axis of rotation of the latter, and a pair of transverse struts pivotally connected to the extremities of said lever arms to form a trapezoidal linkage.

9. In combination, a vehicle frame, a differential elastically supported on said frame, a pair of oppositely extending wheel control arms pivotally mounted at their inner ends on said differential, each arm having a driven road wheel mounted on the outer end thereof, a longitudinally extending laminated leaf torsion spring of generally square cross section disposed between each arm and said vehicle, socket means rigidly connecting the rearward end of each spring to the adjacent arm, an anchor member connected to the forward end of each spring, pivot means for each of said anchors elastically mounted on said vehicle on a longitudinal axis colinear with the major axis of the associated spring, oppositely extending lever arms integrally formed on each anchor in a plane normal to the axis of rotation of the latter, and a pair of transverse struts having their extremities pivotally connected to the extremities of said lever arms to form a trapezoidal linkage.

10. In combination, a vehicle frame, a transverse subframe elastically supported at its opposite extremities on said frame, a differential rigidly supported on said subframe, a pair of oppositely extending wheel control arms pivotally mounted at their inner ends on said differential, each arm having a driven road wheel mounted on the outer end thereof, a longitudinally extending laminated leaf torsion spring or generally square cross section disposed between each arm and said vehicle, socket means rigidly connecting the rearward end of each spring to the adjacent arm, an anchor member connected to the forward end of each spring, pivot means for each of said anchors elastically mounted on said vehicle on a longitudinal axis colinear with the major axis of the associated spring, oppositely extending lever arms integrally formed on each anchor in a plane normal to the axis of rotation of the latter, and a pair of transverse struts having their extremities pivotally connected to the extremities of said lever arms to form a trapezoidal linkage.

11. The structure set forth in claim 9 wherein the projected axis of the inboard end of each control arm intersects the geometric center of the pivot means of the associated spring anchor.

12. The structure set forth in claim 10 wherein the lateral distance between the elastic mounting of said subframe is approximately equal to the lateral distance between the elastic mountings of the pivot means of the spring anchors.

13. In a vehicle suspension, a pair of oppositely extending swing axles each having a driven road wheel mounted on the outer end thereof, a longitudinally extending laminated leaf torsion spring of generally square cross section disposed between each axle and said vehicle, socket means rigidly connecting the rearward end of each spring to the adjacent swing axle, an anchor member connected to the forward end of each spring, means pivotally mounting each of said anchors to said vehicle on a longitudinal axis colinear with the major axis of the associated spring, an upper and a lower lever arm formed on each anchor in a plane normal to the axis of rotation of the latter, upper strut means pivotally connected to the extremities of said upper lever arms, and lower transverse strut means pivotally connected to the extremities of said lower lever arms, the distance between the extremities of said upper lever arms being substantially greater than the distance between the extremities of said lower lever arms.

14. The structure set forth in claim 13 in which the upper lever arms are longer than the lower lever arms.

15. The structure set forth in claim 13 including remotely operable means for varying the length ratio of said upper and lower strut means.

16. The structure set forth in claim 14 wherein said lower strut means comprises a pair of rods arranged in vertically staggered substantially end to end relation, and said means for varying the length ratio comprises a floating vertically extending lever pivotally interconnecting said rods and motor means for altering the angular position of said lever.

References Cited in the file of this patent

UNITED STATES PATENTS

| | | |
|---|---|---|
| 2,083,381 | Hutchison | June 8, 1937 |
| 2,852,269 | Gaines | Sept. 16, 1958 |
| 3,029,090 | Wilfert et al. | Apr. 10, 1962 |

FOREIGN PATENTS

| | | |
|---|---|---|
| 149,718 | Great Britain | Aug. 26, 1920 |